(12) United States Patent
Toliver (10) Patent No.: US 7,620,328 B2
(45) Date of Patent: Nov. 17, 2009

(54) MULTI-WAVELENGTH OPTICAL CDMA WITH DIFFERENTIAL ENCODING AND BIPOLAR DIFFERENTIAL DETECTION

(75) Inventor: Paul Toliver, Tinton Falls, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 153 days.

(21) Appl. No.: 11/048,394

(22) Filed: Jan. 31, 2005

(65) Prior Publication Data
US 2006/0171722 A1     Aug. 3, 2006

(51) Int. Cl.
*H04J 14/02* (2006.01)
*H04B 10/04* (2006.01)

(52) U.S. Cl. .................. 398/188; 398/99; 398/201; 398/212

(58) Field of Classification Search .............. 398/188, 398/201, 77–78, 189–191, 212
See application file for complete search history.

(56) References Cited

U.S. PATENT DOCUMENTS

| | | | | |
|---|---|---|---|---|
| 4,779,266 | A | 10/1988 | Chung et al. | 370/441 |
| 4,866,699 | A | 9/1989 | Bracket et al. | 398/78 |
| 4,989,199 | A | 1/1991 | Rzeszewski | 398/46 |
| 5,987,303 | A | 11/1999 | Dutta et al. | 725/106 |
| 6,025,944 | A | 2/2000 | Mendez et al. | 398/78 |
| 6,259,723 | B1 | 7/2001 | Miyashita | 375/141 |
| 6,381,053 | B1 | 4/2002 | Fathallah et al. | 398/99 |
| 6,608,721 | B1 | 8/2003 | Turpin et al. | |
| 2002/0105705 | A1 | 8/2002 | Turpin et al. | 398/141 |
| 2002/0186435 | A1* | 12/2002 | Shpantzer et al. | 359/136 |
| 2003/0043446 | A1 | 3/2003 | Zami et al. | 359/239 |
| 2003/0058504 | A1* | 3/2003 | Cho et al. | 359/161 |
| 2003/0210912 | A1* | 11/2003 | Leuthold et al. | 398/188 |
| 2004/0213579 | A1* | 10/2004 | Chew et al. | 398/183 |
| 2004/0258423 | A1* | 12/2004 | Winzer | 398/202 |
| 2004/0264695 | A1 | 12/2004 | Turpin | |
| 2004/0264979 | A1* | 12/2004 | McKinstrie et al. | 398/189 |

OTHER PUBLICATIONS

Z. Li et al., "Simulation of Mode-locked Ring Laser Based on Nonlinear Polarization Rotation in a Semiconductor Optical Amplifier", in Proc. ICTON 2004, Warsaw, Poland, Jul. 2004, pp. 318-321.

Z. Jiang, et al., "Four User, 2.5 Gb/s, Spectrally Coded O-CDMA System Demonstration Using Low Power Nonlinear Processing," Optical Society of America, c: 2004, No. PDP29.

Avi Pe'er et al., "Optical Code-Division Multiple Access Using Broad-Band Parametrically Generated Light," J. Lightwave Technology, vol. 22, No. 6, Jun. 2004, pp. 1463-1471.

(Continued)

Primary Examiner—Leslie Pascal
(74) Attorney, Agent, or Firm—Philip J. Feig (57) ABSTRACT

The present invention relates generally to an optical CDMA transmission system and method employing differential optical encoding and bipolar decoding. Differential encoding and bipolar decoding may be performed at the bit level, wherein differential phase encoding and decoding occurs on an entire composite signal. Differential encoding and bipolar decoding may also be performed at the chip level, wherein differential phase encoding and decoding occurs on individual spectral components of a given signal.

31 Claims, 4 Drawing Sheets

OTHER PUBLICATIONS

Y. Igarashi et al., "Multirate Coherent Ultrashort Light Pulse CDMA Communication Systems with Multipulse PPM and Power Control," 2004 RISP International Workshop on Nonlinear Circuit and Signal Processing, Hawaii, USA., Mar. 5-7, 2004, pp. 45-48.

A. J. Viterbi, "Principles of Spread Spectrum Communication," Addison-Wesley Publishing Company, pp. 97-98, 1995.

Z. Jiang et al., "High-Contrast Nonlinear Waveform Discrimination at 10GHz in an Ultrafast O-CDMA Testbed," Ultrafast Optics and Optical Fiber Communications Laboratory, Purdue University, IEEE LEOS Annual Meeting, Tucson, AZ, Oct. 2003.

Extended European Search Report of May 29, 2008.

S. Etemad et al,"Optical-CDMA Incorporating Phase Coding of Coherent Frequency Bins: Concept, Simulation, Experiment" Optical Fiber Comm Conference 2004, Los Angeles, CA Feb. 23-25, 2004. IEEE vol. 2, Feb. 26, 2004, pp. 486-489.

Giles R.C. et al, "Tolerence to In-Band Coherent Crosstalk of Differential Phase-Shift-Keyed Signal With Balanced Detection and FEC" IEEE Photonics Tech Letters, IEEE Service Center, Piscataway, NJ, vol. 16, No. 4, Apr. 1, 2004, pp. 1209-1211.

C. Xu, X. Liu, X. Wei, "Differential Phase-Shift Keying for High Spectral Efficiency Optical Transmissions" IEEE Journal of Selected Topics in Quantum Electronic, vol. 10, No. 2, Mar. 2004-Apr. 2004, pp. 281-293.

Z. Jiang et al, "Four-User, 2.5-GB/S, Spectrally Coded OCDMA System Demonstrated Using Low-Power Nonlinear Processing" Journal of Lightwave Technology, IEEE Service Center, New York, NY, vol. 23, No. 1, Jan. 1, 2005, pp. 143-158.

* cited by examiner

MULTI-WAVELENGTH OPTICAL CDMA WITH DIFFERENTIAL ENCODING AND BIPOLAR DIFFERENTIAL DETECTION

STATEMENT REGARDING FEDERALLY SPONSORED RESEARCH

Funding for research was partially provided by the Defense Advanced Research Projects Agency under federal contract MDA972-03-C-0078. The federal government has certain rights in this invention.

BACKGROUND OF THE INVENTION

The present invention relates to optical communication, more particularly to optical code division multiple access ("CDMA") communication employing differential encoding and detection.

In the past, numerous communications schemes have been developed to increase data throughput, decrease error rates and generally improve performance of the communications channel. In frequency division multiple access ("FDMA"), different data streams are assigned to distinct channels at different frequencies of the transmission band. In time division multiple access ("TDMA"), different data streams are assigned to different timeslots in a single frequency of the transmission band. FDMA and TDMA can be quite limited in terms of the number of users and/or data rates they can support for a given transmission band.

One particularly effective communications scheme that has supplanted FDMA and TDMA in many communication architectures is CDMA. CDMA is a form of spread spectrum communications that enables multiple data streams or channels to share a single transmission band at the same time. The CDMA format is akin to a cocktail party in which multiple pairs of people are conversing with one another at the same time in the same room. As anyone who has been in such a situation understands, it can be very difficult to hear the other party in a conversation if there are many conversations occurring simultaneously. For instance, if one pair of speakers is excessively loud, their conversation will drown out the other conversations. If different pairs of people are speaking in the same language, it is possible that the dialog from one conversation will bleed into other conversations in the same language, causing miscommunication. In general, the cumulative background noise from all the other conversations makes it harder to hear the other party speaking. The goal is to find a way for everyone to communicate at the same time so that each pair's conversation, i.e., "signal," is clear while minimizing the "noise" of the other pairs' conversations.

The CDMA multiplexing approach is well known and is explained in detail in the book "CDMA: Principles of Spread Spectrum Communication," by Andrew Viterbi, which was published in 1995 by Addison-Wesley and which is hereby expressly incorporated by reference herein. While the details of CDMA operation are best left to Viterbi's text, it is important to understand some basic CDMA concepts. In CDMA, the bandwidth of the data to be transmitted (user data) is much less than the bandwidth of the transmission band. Unique "pseudonoise" keys are assigned to each channel in a CDMA transmission band. The pseudonoise keys are selected to mimic Gaussian noise (e.g., "white noise") and are also chosen to be maximal length sequences in order to reduce interference from other users/channels. One pseudonoise key is used to modulate the user data for a given channel. This is equivalent to assigning each pair of partygoers a different language to speak.

During modulation, the user data is "spread" across the bandwidth of the CDMA band. That is, all channels are transmitted at the same time in the same frequency band. This is equivalent to all pairs of partygoers speaking at the same time. The introduction of noise and interference from other users during transmission is inevitable (collectively referred to as "noise"). Due to the nature of the pseudonoise key, the noise is greatly reduced during demodulation relative to the user's signal. This is the case because when a receiver demodulates a selected channel, the data in that channel is "despread" while the noise is not despread. Thus, the data is returned to approximately the size of its original bandwidth, while the noise remains spread over the much larger transmission band. Power control for each user can also help to reduce noise from other users. Power control is equivalent to lowering the volume of a loud pair of partygoers.

CDMA has been used commercially for years in wireless telephone ("cellular") and other communications systems. Cellular systems typically operate between 800 MHz and 2 GHz, although individual frequency bands may only be a few megahertz wide. One attractive feature of cellular CDMA is that theoretically there is no hard limit to the number of users in a given bandwidth, unlike FDMA and TDMA. Adding more users to the transmission band merely means that there is more noise to contend with. However, as a practical matter, there is some threshold point at which the "signal to noise" ratio becomes unacceptably noisy. This signal to noise threshold places real constraints on commercial systems in terms of the number of paying customers and/or data rates it can support. Therefore, engineers and scientists continually seek to improve CDMA systems by improving the signal to noise ratio.

Recently, CDMA has seen increasing use in optical communications networks. Optical CDMA employs the same general principles as cellular CDMA. Unlike cellular CDMA, optical CDMA signals are modulated at optical frequencies. Regardless, the signal to noise ratio for optical CDMA is just as important as in cellular CDMA. In the past, optical CDMA has employed on-off keying ("OOK") as part of the encoding and decoding process. However, it is desirable to develop new encoding and decoding technologies that enhances the signal to noise ratio.

SUMMARY OF THE INVENTION

In accordance with an embodiment of the present invention, an optical CDMA transmitter is provided. The optical CDMA transmitter comprises a DPSK encoder, an optical pulse source and a spectral encoder. The DPSK encoder is for DPSK encoding an input message. The optical pulse source is for generating a multi-carrier signal that is modulated by the DPSK encoded input message. The spectral encoder is operatively connected to the DPSK encoder and the optical pulse source. The spectral encoder performs spectral phase encoding on the optically modulated and DPSK encoded input message to generate an encoded signal.

Preferably, in one alternative, the spectral encoder applies a phase shift to spectral components of the optically modulated and DPSK encoded input message. The phase shift may be fixed or for enhanced security, dynamically time varying at some predetermined rate. In another alternative, the pulse source preferably comprises a coherent optical multi-wavelength pulse source.

In yet another alternative, the optical CDMA transmitter may further comprise a phase modulator operatively connected to the spectral encoder, wherein the phase modulator differentially phase shifts input light signals according to the incoming differentially-encoded data bit sequence. In this case, the phase modulator preferably receives the carrier signal from the pulse source and the DPSK encoded input message from the DPSK encoder, performs a differential phase shift on the optically modulated and DPSK encoded input message to generate an intermediate signal, and supplies the intermediate signal to the spectral encoder.

In another case, the phase modulator may be integral with the spectral encoder. Here, the DPSK encoded input message preferably comprises a plurality of DPSK encoded input messages and the phase modulator preferably comprises a plurality of phase modulators to generate respective intermediate signals for spectral phase encoding by the spectral encoder.

In accordance with another embodiment of the present invention, an optical CDMA transmitter is provided. The transmitter comprises means for DPSK encoding an input message, means for generating a carrier signal that is modulated by the DPSK encoded input message, and means for performing spectral phase encoding on the optically modulated and DPSK encoded input message to generate an encoded signal.

In accordance with a further embodiment of the present invention, an optical CDMA receiver is provided. The receiver comprises a spectral decoder, a DPSK demodulator and an optical sampler. The spectral decoder is for receiving an encoded signal from a transmitter and performing spectral phase decoding on the encoded signal. The DPSK demodulator is operatively connected to the spectral decoder for performing DPSK decoding on the encoded signal. The optical sampler is operatively connected to the spectral decoder and the DPSK demodulator for extracting a selected channel from the encoded signal after spectral phase decoding.

In an alternative, the spectral decoder is matched to a spectral phase encoder of the transmitter. In another alternative, the DPSK demodulator is integral with the spectral decoder, and the optical sampler extracts the selected channel after DPSK decoding. Preferably, in this case the spectral decoder is operable to generate a phase corrected signal for a selected data channel, and the DPSK decoder comprises a plurality of DPSK decoders to process the phase corrected signal and to generate a differential signal.

In another alternative, the receiver preferably further comprises a differential photoreceiver operatively connected to the DPSK demodulator for generating an output message based upon the selected channel. In this case, the output message preferably comprises an electrical signal.

In accordance with another embodiment of the present invention, an optical CDMA receiver is provided. The receiver comprises means for receiving an encoded signal from a transmitter and performing spectral phase decoding on the encoded signal, means for performing DPSK demodulation on the encoded signal, and means for extracting a selected channel from the encoded signal after spectral phase decoding.

In accordance with yet another embodiment of the present invention, an optical CDMA transmission method is provided. The transmission method comprises receiving user data, performing DPSK encoding on the user data to generate a DPSK encoded signal, optically modulating the DPSK encoded signal, and performing spectral phase encoding on the DPSK encoded signal.

In one alternative, the transmission method further comprises performing phase modulation on the DPSK encoded signal. In one example, the spectral phase encoding is performed on the DPSK encoded signal after phase modulation. In another example, the spectral phase encoding and the phase modulation are performed concurrently.

In accordance with a further embodiment of the present invention, an optical CDMA reception method is provided. The reception method comprises receiving an optical CDMA encoded signal, performing spectral phase decoding on the optical CDMA encoded signal, performing DPSK demodulation on the optical CDMA encoded signal, sampling the optical CDMA encoded signal, and generating an output message.

In one alternative, the spectral phase decoding and the DPSK demodulation are performed concurrently. In another alternative, sampling is performed after spectral phase decoding and prior to DPSK demodulation.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

Figure 1:
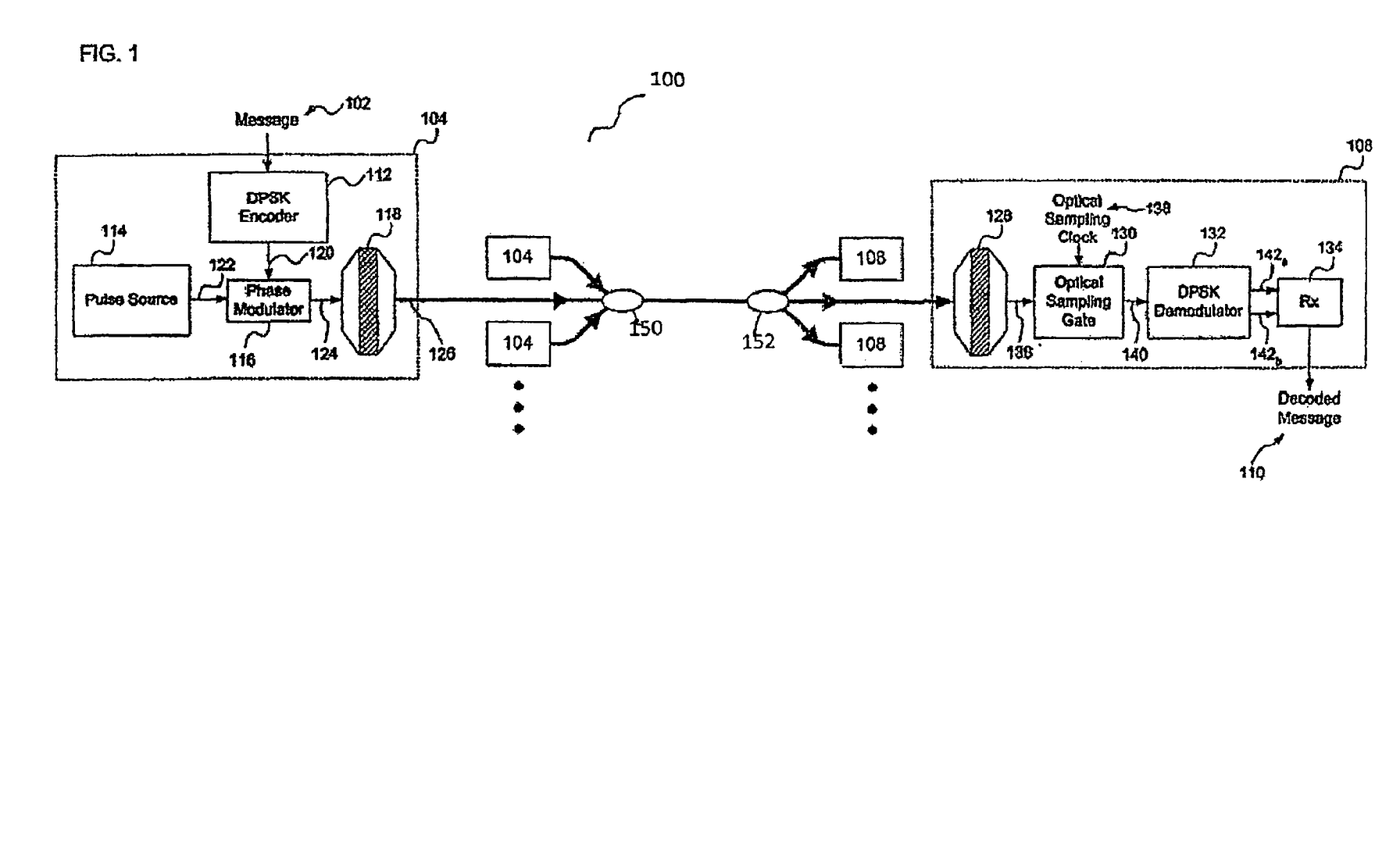
FIG. 1 illustrates a communications system in accordance with an embodiment of the present invention.

FIG. 1 illustrates an optical CDMA communications system 100. A message 102 is input to a transmitter 104. The message may be, for instance, a voice communication, a video transmission, graphical information or other data. The message 102 is processed by the transmitter 104 to generate an encoded message as will be explained below, and then the encoded message is passed through a communications channel 106 to a receiver 108. The receiver 108 receives the encoded message, processes the encoded message as will be explained below, and then generates a decoded message 110.

The transmitter 104 preferably includes a differential phase shift key ("DPSK") encoder 112, a pulse source 114, a phase modulator 116 and a spectral phase encoder 118. The DPSK encoder 112 receives the message 102 and performs differential phase shift keying on the message 102 to generate a differentially encoded signal 120. DPSK 112 may comprise a conventional electronic differential phase shift encoder, which determines the phase of each bit in the message based on one or more previous bits.

The differentially encoded signal 120 is supplied to the phase modulator 116. A carrier signal 122 is also supplied to the phase modulator 116. The carrier signal 122 is preferably generated by the pulse source 114. The carrier signal 122 is preferably a multi-wavelength optical signal, and the pulse source 114 is preferably a coherent multi-wavelength light source.

Figure 2:
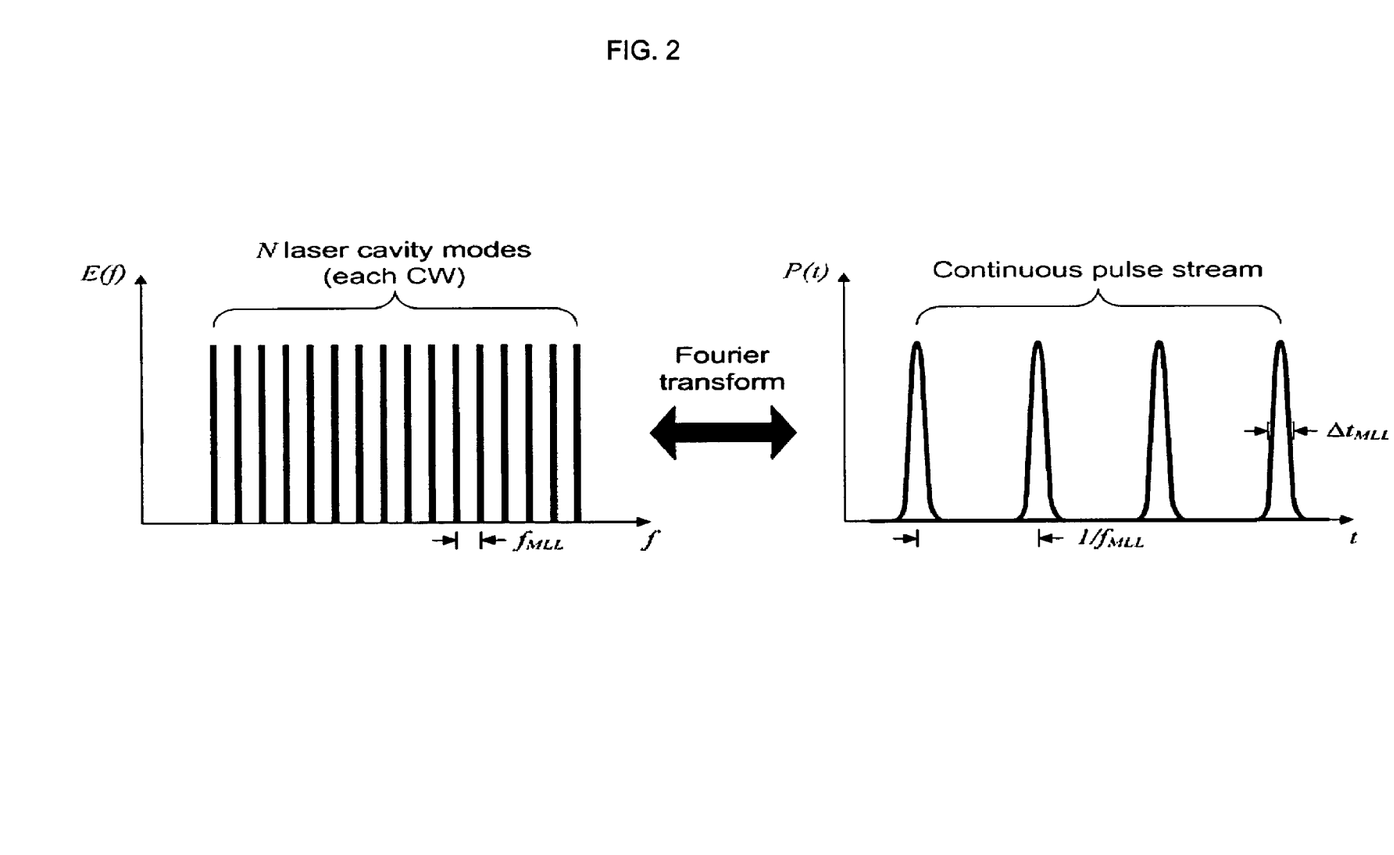
FIG. 2 illustrates a time and frequency domain transform for a multi-wavelength source.

For example, the pulse source 114 may be a mode-locked laser, which is capable of providing a multi-wavelength comb signal, wherein the comb spacing is equal to the laser repetition rate. A mode-locked laser can be constructed using semiconductor optical amplifiers, erbium-doped fiber amplifiers, or other optical amplifiers based on solid state materials. In the mode-locked condition, a well-defined phase relationship is maintained between each of the spectral components. FIG. 2 illustrates that, by locking the spectral modes in the frequency domain, a stream of short pulses is generated in the time domain.

Returning to FIG. 1, the phase modulator 116 functions by shifting the relative phase of light passing through it by a fixed amount at a given wavelength. Desirably, the phase modulator 116 performs binary light modulation of the differentially encoded signal 120 in conjunction with the DPSK encoder 112 while using the carrier signal 122 to generate modulated signal 124. Preferably, a single data signal is applied to the modulator; therefore the data modulation for a single user is applied to all wavelengths/modes generated by the pulse source. In particular, differential phase encoding occurs on each optical pulse that exits the pulse source 114 to preferably produce a DPSK encoded optical signal, such as modulated signal 124. For example, the phase modulator 118 may decide whether to shift the phase of each optical pulse passing through by 0 or 180 degrees depending upon the previous optical pulse, each optical pulse representing a data bit. Put another way, the phase of each data bit may be shifted by 0 or 180 degrees depending upon the value of the previous bit. An advantage of differential optical encoding in accordance with aspects of the present invention is an increase in the signal to noise ratio at the receiver 108, which can significantly boost system performance.

The DPSK encoder 112 and the phase modulator 116 may be a single component or may comprise discrete components. Preferably, the phase modulator 116 may be a lithium niobate ($LiNbO_3$) modulator when the data rate is up to 40 gigabits per second. However, other electro-optical devices may be employed depending upon overall system constraints, including cost, data rates, bit error rates, etc.

The modulated signal 124 is supplied to the spectral phase encoder 118. The spectral phase encoder 118 operates on the entire composite signal of an optical pulse by applying a phase mask to the modulated signal 124. The phase mask preferably corresponds to a predetermined optical CDMA code (e.g., a pseudorandom orthogonal code). The spectral phase encoder 118 separates the optical signal into separate spectral components and introduces a distinct optical phase shift for each spectral component based on the phase mask. Preferably each spectral component corresponds to the different wavelengths/modes generated by the pulse source 114. Each user or each message from a particular user is desirably assigned a unique phase code at any given time. Therefore, each of the spectral components are phase encoded in a unique manner in the frequency domain such that at the receiving end only the receiver that includes the appropriate phase mask may spectrally decode the signal. The phase shift may be fixed or dynamically time varying. A fixed (static) phase shift may be created using simple delay elements. The delay is preferably a fraction of a wavelength and is desirably determined by the particular set of orthogonal CDMA codes employed. A variable phase shift may be a programmable phase shift generated using a controllable phase element constructed, for example, from lithium niobate or an equivalent electro-optic material. Furthermore, each spectral component may have a different phase value applied to it.

There are many ways to implement the spectral phase encoder 118. For example, free space devices such as grating-based Fourier transform systems (e.g., optical pulse shapers) or hyperfine optical filters may be used. Alternatively, fiber Bragg gratings or planar lightwave circuits such as arrayed waveguide gratings can be employed. As mentioned above with regard to the phase modulator 116, other devices may be employed depending upon overall system constraints, including cost, data rates, bit error rates, etc.

The spectral phase encoder 118 outputs an encoded message 126, which is passed through the communications channel 106 to the receiver 108. FIG. 1 illustrates a multi-user optical CDMA system having multiple transmitters, each depicted as transmitter 104 and multiple receivers, each depicted as receiver 108. The optical signals from each of the transmitters are combined into a single multi-access optical channel, e.g., 106, using passive optical combining techniques, such as passive fiber optic or free-space combiners. FIG. 1 depicts a passive optical coupler 150 for combining the encoded optical signals, e.g., encoded message 126, output from the transmitter 104. The communications channel 106 is desirably a multi-access or multi-user channel, which may be free space or at least one optical fiber, for example. The encoded message 126 may be further processed before or during transmission across the communications channel 106, for instance by multiplexing groups of signals together and/or polarizing the transmitted signals as part of the optical transmission process, or being amplified by an optical amplifier acting as a repeater. The combined optical signal is separated prior to being received by each receiver 108 by a passive optical splitter 152.

The receiver 108 preferably includes a spectral phase decoder 128, an optical sampling gate 130, a DPSK demodulator 132 and a differential photoreceiver 134. Upon receipt by the receiver 108, the spectral phase decoder 128 processes the encoded message 126. The spectral phase decoder 128 operates in the same general manner as the spectral phase encoder 118, except in reverse. The spectral phase decoder applies a phase mask to the encoded message 126. The phase mask should correspond to same predetermined optical CDMA code as on the transmitter side. Thus, the spectral phase decoder 128 restores the correct phase to each spectral component. As with the spectral phase encoder 118, phase shifting in the spectral phase decoder 128 may be fixed or variable, and may be performed in the same manner.

The spectral phase decoder 128 generates a phase corrected signal 136 from the encoded message 126. At this point in the processing of a particular signal/data channel, other phase corrected signals 136 are temporarily spread out and tend to look like background noise. That is, only the signals encoded using a matching phase mask will be decoded by the spectral phase decoder 128.

The optical sampling gate 130 extracts a desired data channel after the spectral phase decoder 128 has properly decoded the channel. The optical sampling gate 130 samples each phase corrected signal 136 and suppresses portions of the phase corrected signals that fall outside a sampling window based upon a control signal or optical sampling clock signal 138. The size of the sampling window is determined by the optical sampling gate. The optical sampling clock signal 138 preferably comprises a continuous sequence of short optical pulses generated at the data repetition rate. The clock signal could be generated, for instance, by using either a network-wide global clock signal that would be available at all users or by using optical clock recovery techniques at each OCDMA receiver 108. The suppressed portions of the phase corrected signal 136 include noise as well as multi-user interference generated by other users/signals of the optical CDMA system 100. The optical sampling window is a narrow temporal gating window whose size depends upon the transmission bandwidth and the size of the data pulses that are to be extracted. After processing, the optical sampling gate 130 then generates a sampled signal 140.

The typical bandwidth of an optical CDMA system can be on the order of tens of gigahertz, and the data pulses can be very narrow, for instance on the order of tens of picoseconds or less. The optical sampling gate 130 may be implementing in numerous ways. By way of example only, suitable technologies include nonlinear fiber-based interferometers, nonlinear semiconductor optical amplifier-based interferometers, nonlinear devices based on four wave mixing, and electro-absorption modulator gates.

The DPSK demodulator 132 is preferably an optical DPSK demodulator that performs bipolar decoding on the sampled signal 140. The DPSK demodulator 132 desirably performs optical decoding/demodulation by optically interfering two adjacent data bits and providing two differential optical signals, $142_a$ and $142_b$. The differential optical signals 142a and 142b are desirably complementary signals of one another; that is, if all optical power is exiting a port associated with signal 142a, it is not present at the port associated with the signal 142b (or vice versa). This optical interference can be performed using a 2-arm interferometer configuration with a 1-bit optical delay in one of the arms. For example, a Mach-Zehnder interferometer or a Michelson interferometer may be used.

The differential photoreceiver 134 receives the two differential optical signals $142_a$ and $142_b$ and generates the decoded message 110 from them. The decoded message 110 can then be directly transmitted to the recipient (not shown), or may be subject to further processing and/or transmission techniques.

As can be seen from the embodiment described above, it is possible to perform differential encoding and bipolar decoding at the bit level, wherein differential phase encoding and decoding occur in a composite manner on the entire signal of a particular optical pulse. On the transmit side, a message is DPSK encoded and then optically modulated using a multi-wavelength light source. The composite optically modulated signal is phase modulated and then subject to spectral phase encoding. On the receive side, the encoded message is spectrally phase decoded. Optical sampling is then performed in accordance with a control signal. The sampled signal is optically DPSK decoded to generate a differential signal that can be processed to obtain a decoded message.

It is also possible to perform differential encoding and bipolar decoding at the chip level. Here, differential phase encoding and decoding are performed on individual spectral components of a multi-wavelength source, rather than on an entire composite signal.

Figure 3:
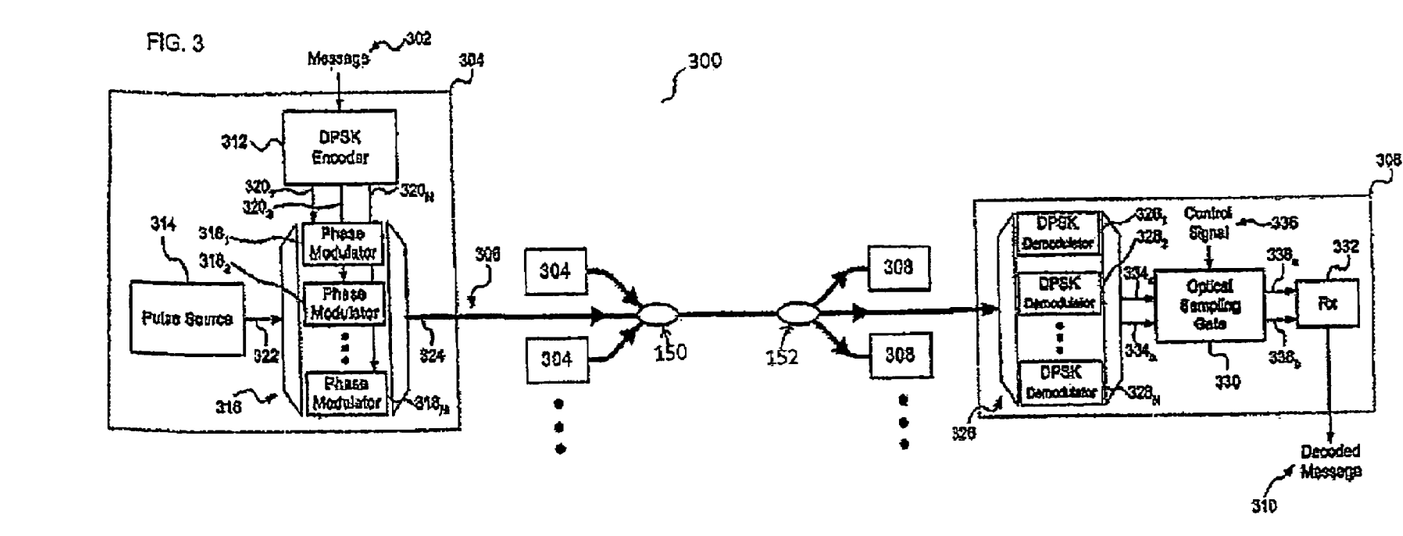
FIG. 3 illustrates a communications system in accordance with another embodiment of the present invention.

FIG. 3 illustrates an optical CDMA communications system 300 for use with chip level differential phase encoding and decoding. As seen in the figure, a message 302 is input to a transmitter 304. The message may be, for instance, a voice communication, a video transmission, graphical information or other data. The message 302 is processed by the transmitter 304 to generate an encoded message as will be explained below, and then the encoded message is passed through a communications channel 306 to a receiver 308. The receiver 308 receives the encoded message, processes the encoded message as will be explained below, and then generates a decoded message 310.

The transmitter 304 preferably includes a DPSK encoder 312, a pulse source 314, and a spectral phase encoder 316, which desirably includes multiple phase modulators $318_1$ to $318_N$. The DPSK encoder 312 receives the message 302 and performs differential phase shift keying on the message 302 to generate a differentially encoded optical signal 320. As discussed earlier, an advantage of differential optical encoding in accordance with aspects of the present invention is an increase in the signal to noise ratio at the receiver 308, which can significantly boost performance.

The differentially encoded signal(s) 320 is supplied to the spectral phase encoder 316. A carrier signal 322 is also supplied to the spectral phase encoder 316. The carrier signal 322 is generated by the pulse source 314. The carrier signal 322 is preferably a multi-wavelength optical signal, and the pulse source 314 is preferably a coherent optical multi-wavelength pulse source as described above with regard to the pulse source 114.

The spectral phase encoder 316 applies a phase mask to each differentially encoded signal 320 at the chip level. Each differentially encoded signal $320_1$ to $320_N$ is also individually phase modified by a respective phase modulator $318_1$ to $318_N$. The phase mask preferably corresponds to a predetermined optical CDMA code. The spectral phase encoder 316 introduces a distinct optical phase shift for each differentially encoded signal 320. The spectral phase components correspond to a particular optical CDMA code, wherein each user or message is desirably assigned a unique phase code at any given time. The phase shift may be fixed or dynamically time varying. A fixed (static) phase shift may be created using simple delay elements. The delay is preferably a fraction of a wavelength. A variable phase shift may be a programmable phase shift generated using a controllable phase element constructed from lithium niobate or equivalent electro-optic material. The chip-level encoding process can further increase the suppression of noise from other users (other messages 302) relative to the bit-level encoding process described earlier.

As discussed above, there are many ways to implement the spectral phase encoder 316. For example, free space devices such as grating-based Fourier transform systems (e.g., optical pulse shapers) or hyperfine optical filters may be used. Alternatively, fiber Bragg gratings or planar lightwave circuits such as arrayed waveguide gratings can be employed. Other devices may be employed depending upon overall system constraints, including cost, data rates, bit error rates, etc.

The phase modulators $318_1$ to $318_N$ function by shifting the relative phase of light passing through them by a fixed amount at a given wavelength. For example, the phase of each data bit may be shifted by 0 or 180 degrees depending upon the value of the previous bit. The spectral phase encoder 316 and the phase modulators $318_1$ to $318_N$ may be a single component or may comprise discrete components. Preferably, the phase modulators 318 may each comprise a lithium niobate (LiNbO$_3$) modulator when the data rate is up to 40 gigabits per second. However, other electro-optical devices may be employed depending upon overall system constraints, including cost, data rates, bit error rates, etc.

The combination spectral phase encoder 316 and phase modulator 318 outputs an encoded message 324, which is passed through the communications channel 306 to the receiver 308. FIG. 3 illustrates a multi-user optical CDMA system having multiple transmitters, each depicted as transmitter 304 and multiple receivers, each depicted as receiver 308. The optical signals from each of the transmitters are combined into a singe multi-access optical channel, e.g., 306 using passive optical combining techniques, such as passive fiber optic or free-space combiners. FIG. 3 depicts a passive optical coupler 150 for combining the encoded optical signals, e.g., encoded message 324, output from the transmitter 304. The communications channel 306 is desirably a multi-access or multi-user channel, which may be free space or one or more optical fibers, for example. The encoded message 324 may be further processed before or during transmission across the communications channel 306, for instance by multiplexing groups of signals together and/or polarizing the transmitted signals as part of the transmission process. The combined optical signal is separated prior to being received by each receiver 308 by a passive optical splitter 152.

The receiver 308 preferably includes a spectral phase decoder 326, a plurality of DPSK demodulators $328_1$ to $328_N$, an optical sampling gate 330, and a differential photoreceiver 332. Upon receipt by the receiver 308, the spectral phase decoder 326 desirably processes the encoded message 324 in conjunction with the DPSK demodulators $328_1$ to $328_N$. The spectral phase decoder 326 operates in the same general manner as the spectral phase decoder 128 described earlier. The spectral phase decoder 326 applies a phase mask to the encoded message 324. The phase mask should correspond to same predetermined optical CDMA code as on the transmitter side. Thus, the spectral phase decoder 326 restores the correct phase to each individual spectral component of the encoded message.

As with the spectral phase encoder 316, phase shifting in the spectral phase decoder 326 may be fixed or dynamically time varying, and may be performed in the same manner. The spectral phase encoder 316 and the phase modulators $318_1$ to $318_N$ may be a single component or may comprise discrete components. The DPSK demodulators $328_1$ to $328_N$ are preferably integral with the spectral phase decoder 326.

In the present embodiment, a plurality of DPSK demodulators $328_1$ to $328_N$ is provided. Each DPSK demodulator $328_1$ to $328_N$ is preferably an optical DPSK demodulator that performs bipolar decoding on a selected data stream in the encoded message 324. The DPSK demodulators $328_1$ to $328_N$ desirably perform optical decoding/demodulation by optically interfering two adjacent data bits in a given data stream and providing two differential optical signals. This optical interference can be performed using a 2-arm interferometer configuration with a 1-bit optical delay in one of the arms. For example, a Mach-Zehnder interferometer or a Michelson interferometer may be used. There is no preference on the order of spectral decoding and DPSK demodulation. In fact, spectral decoding and DPSK demodulation may also be performed simultaneously by placing a static or dynamically time varying spectral phase element in one arm of the 2-arm interferometer used for DPSK demodulation.

A pair of phase corrected differential optical signals $334_a$ and $334_b$ are output from the combination spectral phase decoder 326 and DPSK demodulators $328_1$ to $328_N$. At this point in the processing of a single signal, other phase corrected signals 334 are temporarily spread out and tend to look like background noise.

The optical sampling gate 330 processes the phase corrected differential optical signals $334_a$ and $334_b$. The optical sampling gate 330 samples both differential optical phase corrected signals $334_a$ and $334_b$ and suppresses portions of the phase corrected signals that fall outside a sampling window based upon a control signal or optical sampling clock 336. The suppressed portions of the phase corrected signals $334_{a,b}$ include noise as well as multi-user interference generated by other users/data streams of the optical CDMA system 300. The sampling window is a narrow temporal gating window whose size depends upon the bandwidth of the system and the size of the data pulses that are to be extracted. After processing, the optical sampling gate 330 then generates a sampled signal 338, preferably in the form of a pair of differential sampled signals $338_a$ and $338_b$ corresponding to the phase corrected signals $334_{a,b}$.

The typical bandwidth of an optical CDMA system can be on the order of tens of gigahertz, and the data pulses can be very narrow, for instance on the order of tens of picoseconds or less. The optical sampling gate 330 may be implementing in numerous ways. By way of example only, suitable technologies include nonlinear fiber-based interferometers, nonlinear semiconductor optical amplifier-based interferometers, nonlinear devices based on four wave mixing, and electro-absorption modulator gates.

The differential photoreceiver 332 receives the sampled signal 338 (e.g., the pair of differential sampled signals $338_a$ and $338_b$) and generates the decoded message 310 from the sampled signal 338. The decoded message 310 may remain an optical signal or may be output by the differential photoreceiver 332 as an electrical signal. The decoded messages 310 can then be directly transmitted to recipients (not shown), or may be subject to further processing and/or transmission techniques.

As can be seen from the embodiment described above, it is possible to perform differential encoding and bipolar decoding at the chip level. On the transmit side, the message is DPSK encoded. Each DPSK encoded message is individually phase modulated, optically modulated using a multi-wavelength light source, and subject to spectral phase encoding. A multiplexed/composite signal is transmitted across an optical transmission medium. On the receive side, the encoded message is DPSK decoded and subject to spectrally phase decoding. Optical sampling is then performed in accordance with a optical sampling clock signal. Sampled signals can be processed to obtain one or more decoded messages.

Figure 4:
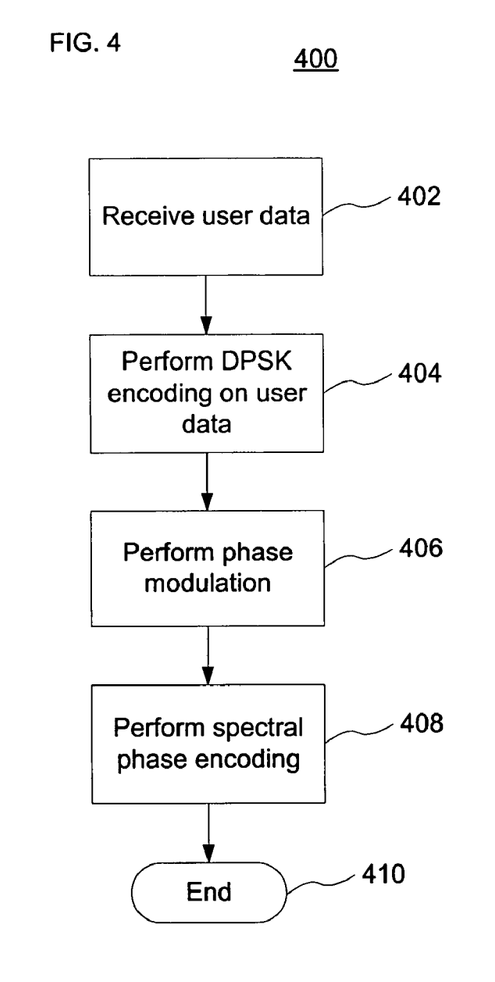
FIG. 4 is a flow diagram of a transmission method in accordance with aspects of the present invention.
Figure 5:
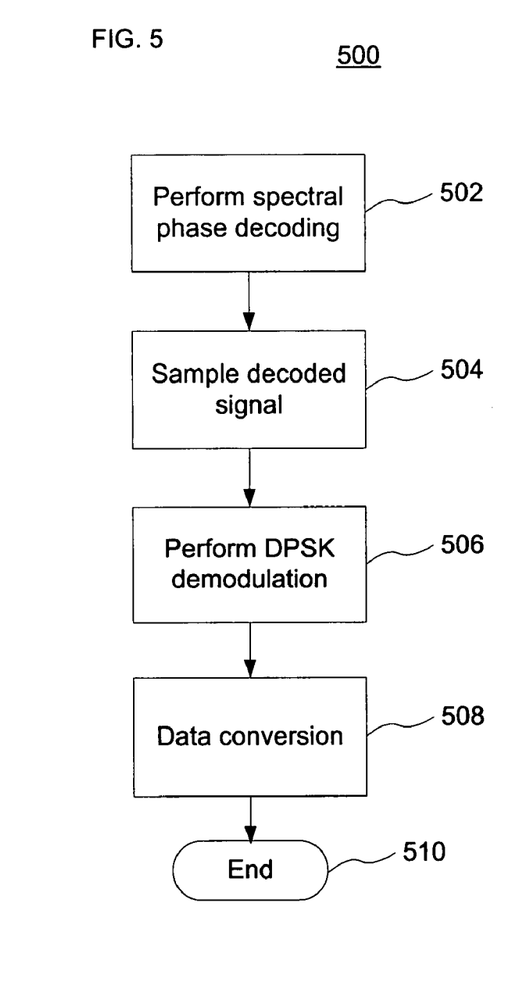
FIG. 5 is a flow diagram of a reception method in accordance with aspects of the present invention.

FIGS. 4 and 5 illustrate flow diagrams of data encoding and decoding processes in accordance with aspects of the present invention. FIG. 4 is a flow diagram 400 showing a spectral phase encoding process in accordance with aspects of the invention. In FIG. 4, the transmitter receives user data in step 402. The DPSK encoder performs DPSK encoding on the user data in step 404. Phase modulation is performed at step 406. Spectral phase encoding is performed at step 408. The spectral phase encoding may be performed at the bit level or at the chip level, as described above. The data encoding process ends at step 410.

FIG. 5 is a flow diagram showing a spectral phase decoding process in accordance with aspects of the present invention. Spectral phase decoding is performed at step 502. In step 504, optical sampling is performed on a decoded signal, for instance by optical sampling gate 130 or 330. DPSK demodulation is performed in step 506. Data conversion may be performed in step 508, for example by receiving differential signals and generating an electrical signal containing the decoded message. While the steps in FIGS. 4-5 are shown in a certain order, it should be understood that the order is not fixed and different steps may be performed in a different order or concurrently depending upon a particular system configuration. By way of example only, DPSK demodulation in step 506 could be performed before or after the sampling step. Also, the steps of phase modulation and spectral phase encoding, and/or the steps of spectral phase decoding and DPSK demodulation may be performed concurrently.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical CDMA transmitter, comprising:
a DPSK encoder for DPSK encoding an input message;
an optical pulse source for generating a carrier signal that is modulated by the DPSK encoded input message; and
a spectral encoder operatively connected to the DPSK encoder and the optical pulse source, the spectral encoder performing spectral phase encoding to spectral components of the optically modulated and DPSK encoded input message to generate an encoded signal, the spectral phase encoding uses a preset optical CDMA code.

2. The optical CDMA transmitter of claim 1, wherein the spectral encoder applies a phase shift to spectral components of the optically modulated and DPSK encoded input message.

3. The optical CDMA transmitter of claim 2, wherein the phase shift is fixed.

4. The optical CDMA transmitter of claim 2, wherein the phase shift is dynamically time varying.

5. The optical CDMA transmitter of claim 1, further comprising a phase modulator operatively connected to the spectral encoder, wherein the phase modulator differentially phase shifts input light signals based upon the DPSK encoded input message.

6. The optical CDMA transmitter of claim 5, wherein the phase modulator receives the carrier signal from the pulse source and the DPSK encoded input message from the DPSK encoder, performs a differential phase shift on the optically modulated and DPSK encoded input message to generate an intermediate signal, and supplies the intermediate signal to the spectral encoder.

7. The optical CDMA transmitter of claim 5, wherein the phase modulator is integral with the spectral encoder.

8. The optical CDMA transmitter of claim 7, wherein the DPSK encoded input message comprises a plurality of DPSK encoded input messages and the phase modulator comprises a plurality of phase modulators to generate respective intermediate signals for spectral phase encoding by the spectral encoder.

9. The optical CDMA transmitter of claim 1, wherein the pulse source comprises a coherent optical multi-wavelength pulse source.

10. The optical CDMA transmitter of claim 1, wherein the spectral encoder assigns a unique phase code for each user at any given time.

11. The optical CDMA transmitter of claim 10, wherein a plurality of input messages each identified by its unique phase code and each carries its own data imparted through DPSK coding are combined into a single multi-access optical channel.

12. An optical CDMA transmitter, comprising:
means for DPSK encoding an input message;
means for generating a carrier signal that is modulated by the DPSK encoded input message; and
means for performing spectral phase encoding to spectral components of the optically modulated and DPSK encoded input message to generate an encoded signal, the spectral phase encoding uses a preset optical CDMA code.

13. The optical CDMA transmitter of claim 12, wherein the spectral encoder assigns a unique phase code for each user at any given time.

14. The optical CDMA transmitter of claim 13, wherein a plurality of input messages each identified by its unique phase code and each carries its own data imparted through DPSK coding are combined into a single multi-access optical channel.

15. An optical CDMA receiver, comprising:
a spectral decoder for receiving an encoded signal from a transmitter and performing spectral phase decoding on the encoded signal;
a DPSK demodulator operatively connected to the spectral decoder for performing DPSK decoding on the encoded signal; and
an optical sampler operatively connected to the spectral decoder and the DPSK demodulator for extracting a selected channel from the encoded signal after spectral phase decoding.

16. The optical CDMA receiver of claim 15, wherein the spectral decoder is matched to a spectral phase encoder of the transmitter.

17. The optical CDMA receiver of claim 15, wherein the DPSK demodulator is integral with the spectral decoder, and the optical sampler extracts the selected channel after DPSK decoding.

18. The optical CDMA receiver of claim 17, wherein the spectral decoder is operable to generate a phase corrected signal for a selected data channel, and the DPSK demodulator comprises a plurality of DPSK demodulators to process the phase corrected signal and to generate a differential signal.

19. The optical CDMA receiver of claim 15, further comprising a differential photoreceiver operatively connected to the DPSK demodulator for generating an output message.

20. The optical CDMA receiver of claim 19, wherein the output message comprises an electrical signal.

21. An optical CDMA receiver, comprising:
means for receiving an encoded signal from a transmitter and performing spectral phase decoding on the encoded signal;
means for performing DPSK demodulation on the encoded signal; and
means for extracting a selected channel from the encoded signal after spectral phase decoding.

22. An optical CDMA transmission method, comprising:
receiving user data;
performing DPSK encoding on the user data to generate a DPSK encoded signal;
optically modulating the DPSK encoded signal; and
performing spectral phase encoding to spectral components of the DPSK encoded signal, the spectral phase encoding using a preset optical CDMA code to generate an encoded signal.

23. The optical CDMA transmission method of claim 2, wherein the performing spectral phase encoder assigns a unique phase code for each user at any given time.

24. The optical CDMA transmission method of claim 23, wherein a plurality of input messages each identified by its unique phase code and each carries its own data imparted through DPSK coding are combined into a single multi-access optical channel.

25. The optical CDMA transmission method of claim 22, further comprising performing phase modulation on the DPSK encoded signal.

26. The optical CDMA transmission method of claim 25, wherein the spectral phase encoding is performed on the DPSK encoded signal after phase modulation.

27. The optical CDMA transmission method of claim 25, wherein the spectral phase encoding and the phase modulation are performed concurrently.

28. An optical CDMA reception method, comprising:
- receiving an optical CDMA encoded signal;
- performing spectral phase decoding on the optical CDMA encoded signal;
- performing DPSK demodulation on the optical CDMA encoded signal;
- sampling the optical CDMA encoded signal; and
- generating an output message related to the optical CDMA encoded signal.

29. The optical CDMA reception method of claim 28, wherein the spectral phase decoding and the DPSK demodulation are performed concurrently.

30. The optical CDMA reception method of claim 28, wherein sampling is performed after spectral phase decoding and prior to DPSK demodulation.

31. An optical CDMA reception method, comprising:
- receiving a plurality of optical CDMA encoded signals, each signal identified by its spectral phase code and each carrying its own data imparted through DPSK coding;
- performing spectral phase decoding of the plurality of CDMA encoded signals to extract individual received signals;
- performing DPSK demodulation of the individual received signals to extract the data carried in each individual received signal; and
- generating a plurality of output messages corresponding to the plurality of data carried in each optical CDMA encoded signal.

* * * * *

UNITED STATES PATENT AND TRADEMARK OFFICE
CERTIFICATE OF CORRECTION

PATENT NO. : 7,620,328 B2
APPLICATION NO. : 11/048394
DATED : November 17, 2009
INVENTOR(S) : Toliver Page 1 of 1

It is certified that error appears in the above-identified patent and that said Letters Patent is hereby corrected as shown below:

On Title Page 2, in Item (56), under "OTHER PUBLICATIONS", in Column 2, Line 3, delete ""Tolerence" and insert -- "Tolerance --, therefor.

In the Specification

In Column 8, Line 60, delete "singe multi-access" and insert -- single multi-access --, therefor.

In the Claims

In Column 12, Line 50, in Claim 23, delete "claim 2," and insert -- claim 22, --, therefor.

Signed and Sealed this
Eighteenth Day of November, 2014

Michelle K. Lee
*Deputy Director of the United States Patent and Trademark Office*